United States Patent
Koss et al.

[11] Patent Number: 6,153,945
[45] Date of Patent: Nov. 28, 2000

[54] GENERATOR REGULATOR WITH OVERLOAD PROTECTION MEANS

[75] Inventors: Thomas Koss, Reutlingen; Gerhard Fiedler, Neckartailfingen; Guenter Nasswetter, Gomaringen; Egon Reisz, Reutlingen, all of Germany

[73] Assignee: Robert Bosch GmbH, Stuttgart, Germany

[21] Appl. No.: 09/242,042

[22] PCT Filed: Mar. 21, 1998

[86] PCT No.: PCT/DE98/00835

§ 371 Date: Feb. 6, 1999

§ 102(e) Date: Feb. 6, 1999

[87] PCT Pub. No.: WO99/01920

PCT Pub. Date: Jan. 14, 1999

[30] Foreign Application Priority Data

Jun. 30, 1997 [DE] Germany .......................... 197 27 876

[51] Int. Cl.[7] ..................................................... H02J 7/16
[52] U.S. Cl. .................. 307/10.1; 307/9.1; 320/DIG. 11; 322/25; 322/27; 322/28
[58] Field of Search ................................... 307/10.1, 9.1; 322/25, 27, 28, 18; 320/123, DIG. 11

[56] References Cited

U.S. PATENT DOCUMENTS

| | | | |
|---|---|---|---|
| 4,346,337 | 8/1982 | Watrous | 322/28 |
| 4,386,310 | 5/1983 | Sievers | 322/28 |
| 4,636,706 | 1/1987 | Bowman et al. | 322/28 |
| 4,680,529 | 7/1987 | Komurasaki et al. | 322/28 |
| 5,093,583 | 3/1992 | Mashino et al. | 307/10.1 |

FOREIGN PATENT DOCUMENTS 34 02 288 A1  4/1985  Germany .

OTHER PUBLICATIONS

Dr. Guenter Springer: "Bearbeiten Von Lehren An Berif;Ichen Schulen Und Von Ingenieuren" In Fachkunde Elektrotechnik 21, Jan. 1996.

*Primary Examiner*—Albert W. Paladini
*Attorney, Agent, or Firm*—Michael J. Striker

[57] ABSTRACT

The generator regulator includes a transistor power end stage (14) connected to the excitation winding (12) of the generator to provide a pulsed excitation current that passes through the excitation winding during operation and a device for activating and deactivating the transistor power end stage to turn on and off the excitation current in order to provide a predetermined pulse width for the pulsed excitation current passing through the excitation winding so as to maintain a constant output voltage. The device for activating and deactivating the transistor power end stage includes a comparator (16) for comparing a saturation voltage ($U_{SAT}$) of the transistor power end stage (14) picked up between the transistor power end stage and the excitation winding with a reference voltage ($U_{ref}$) to provide a comparison output and a pulse width modulation circuit (22) for controlling the transistor power end stage (14) to vary the predetermined pulse width of the pulsed excitation current according to the comparison output so that the transistor power end stage (14) is not damaged by short circuits.

7 Claims, 1 Drawing Sheet

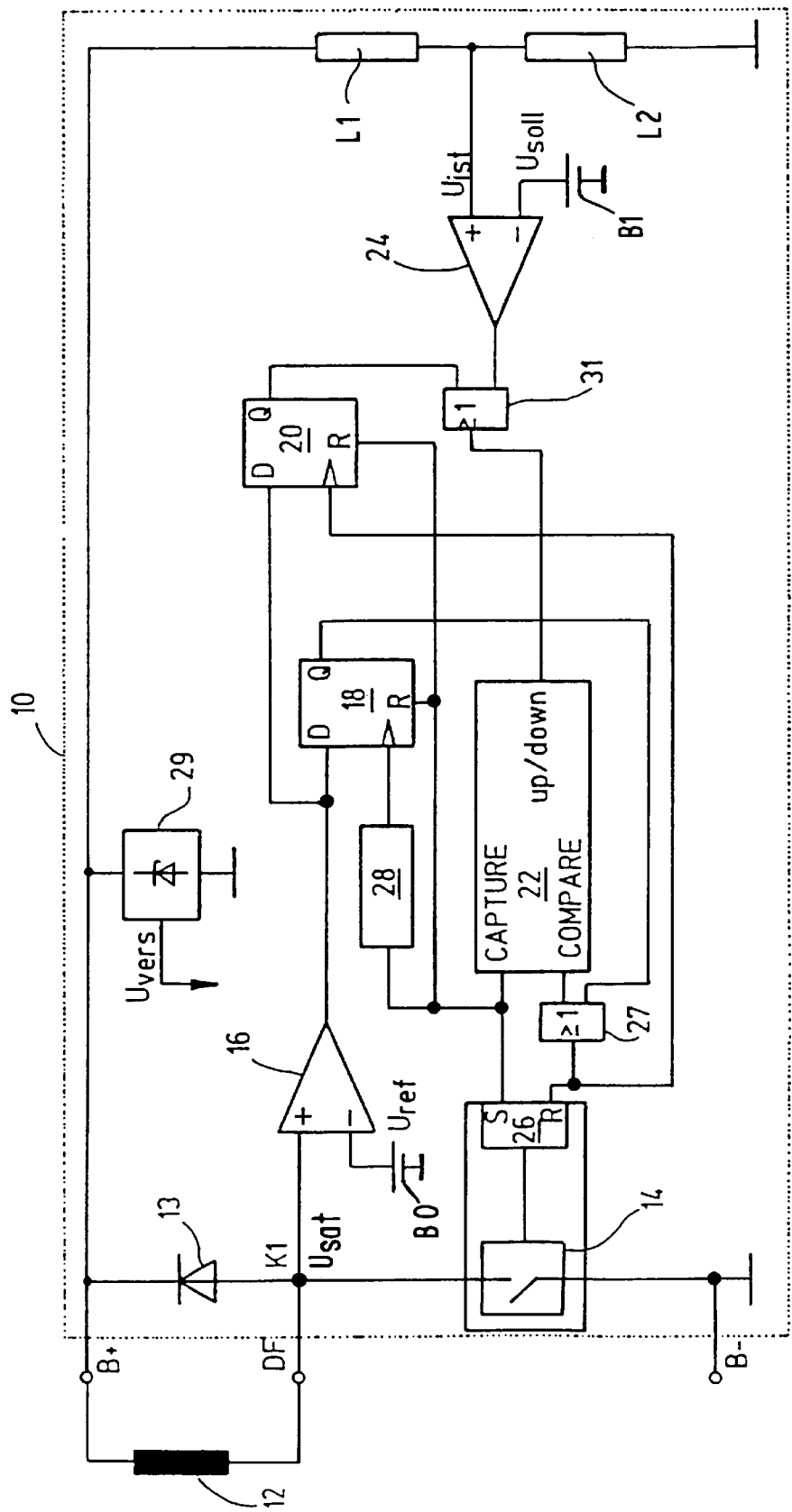

GENERATOR REGULATOR WITH OVERLOAD PROTECTION MEANS

BACKGROUND OF THE INVENTION

1. Field of the Invention

The invention relates to a generator regulator, in particular for regulating the on-board voltage in motor vehicles, which regulates the output voltage of a generator and affects an exciting current flowing over an exciting winding of the generator.

2. Prior Art

A generator for vehicles with a voltage regulator, which is part of a control device, is known from DE 34 02 288 A1. The voltage regulator therein described measures an actual voltage value (output voltage) of the generator and compares it with an internally formed nominal value. In accordance with this comparison, a clocked exciting current is supplied to the exciting winding of the generator via a transistor power end stage.

SUMMARY OF THE INVENTION

It is an object of the present invention to provide a generator regulator of the above-described type, which has protection from overloads due to short circuits and the like.

According to the invention the generator regulator for a generator excited with an excitation winding comprises a transistor power end stage connected to the excitation winding of the generator and including means for providing a pulsed excitation current that passes through the excitation winding during operation; and means for activating and deactivating the transistor power end stage to turn on and off the excitation current in order to provide a predetermined pulse width for the pulsed excitation current passing through the excitation winding so as to maintain a constant output voltage of the generator.

The means for activating and deactivating the transistor power end stage includes necessarily means for comparing a saturation voltage of the transistor power end stage picked up at a node between the transistor power end stage and the excitation winding with a reference voltage to provide a comparison output and a pulse width modulation circuit for controlling the transistor power end stage to vary the predetermined pulse width of the pulsed excitation current according to the comparison output whereby damage to the transistor power end stage due to short circuits is prevented.

The generator regulator in accordance with the invention offers the advantage that the transistor power end stage controlling the exciting winding is protected against overloads in case of a short circuit or when being operated at low ohmic loads. Because a saturation voltage of a transistor power end stage controlling the exciting winding is compared with a reference voltage, and the pulse width of exciting current is modulated as a function of the result of the comparison, it is advantageously possible to eliminate occurring differences in the output capabilities of the transistor power end stage by regulating the exciting current, and a power loss of the transistor power end stage can be limited.

Advantageous embodiments of the invention ensue from the remaining characteristics mentioned in the dependent claims.

BRIEF DESCRIPTION OF THE DRAWING

The objects, features and advantages of the invention will now be illustrated in more detail with the aid of the following description of the preferred embodiment, with reference to the accompanying sole figure which is a block diagram of a circuit for an output voltage regulator of a generator according to the invention.

DETAILED DESCRIPTION OF THE INVENTION

The circuit arrangement of a voltage regulator 10 of a generator, not shown in detail, for generating an on-board voltage of a motor vehicle is represented in the drawings. The voltage regulator 10 has external terminals B+, DF and B−. An exciting winding 12 of the generator is connected with the external terminals B+ and DF. A freewheeling diode 13 is connected parallel with the exciting winding 12, which picks up a freewheeling current when the inductive load of the exciting winding 12 is switched off. The exciting winding 12 is controlled by means of a transistor power end stage 14 which, for example, can be constituted by a Darlington circuit. In the switched-on state, the transistor power end stage 14 connects the terminal DF with the terminal B−, i.e. with ground. With the transistor power end stage 14 closed, the exciting current flows through the exciting winding 12, so that a magnetic field is generated in the known manner and induces a voltage in the generator winding, not represented.

A node K1 is connected with a first input+of a comparator 16, to whose second input−a reference voltage $U_{REF}$ is applied by means of battery BO. The output of the comparator 16 is connected with the inputs of a first flip-flop 18 and a second flip-flop 20. An output of the first flip-flop 18 is connected with an input of an OR gate 27. The output of this OR gate is connected with the set input of the second flip-flop 20. The output of the second flip-flop 20 is connected with an input of an OR gate 31, whose output is connected with a regulating connection up/down of a pulse width modulating circuit 22. A second input of the OR gate 31 is connected with the output of a comparator 24. The comparator 24 has a first input + to which an actual voltage $U_{ist}$ is applied. The actual voltage $U_{ist}$ is equal to the actual voltage at the terminal B+ reduced by a voltage drop due to the first resistor L1. The comparator 24 also has a second input—connected with a terminal of the battery B1, which supplies a set value $U_{soll}$ for the voltage applied to the first input, $U_{ist}$. The first input of the comparator 24 is also grounded through the second resistor L2.

A starting output Capture of the pulse width modulating circuit 22 is connected with a set input of flip-flop 26, and an output "compare" of the pulse width modulating circuit 22 is connected with another input of the OR gate 27. The output of this OR gate 27 is connected with the reset input R of the flip-flop 26. The output of the flip-flop 26 is connected with a control connection of the transistor power end stage 14. The starting output Capture of the pulse width modulating circuit 22 is further connected with a delay member 28, which is connected to a set input of the flip-flop 18. The output Capture is furthermore connected with reset inputs of the flip-flops 18 and 20. A supply voltage module is identified with 29, which makes a supply voltage $U_{VERS}$ of the circuit arrangement 10 available. The supply voltage $U_{VERS}$ is stabilized by means of a Zener diode.

The circuit arrangement shown in the drawings performs the following functions:

The saturation voltage $U_{SAT}$ of the transistor power end stage 14 is measured at the node K1 during the operation of the exciting winding 12. This is compared with a reference voltage $U_{REF}$ via the comparator 16. If the saturation voltage exceeds the reference voltage $U_{REF}$ during the time the transistor power end stage 14 is switched on, the pulse width with which the transistor power end stage 14 is controlled is reduced during the next period (switching period). This takes place in that the output signal of the comparator 16 is applied to the input D of the second flip-flop 20, so that the flip-flop 20 is triggered by means of that input signal to it and the signal applied to the output Q controls the regulating connection up/down of the pulse width modulating circuit 22. By this a pulse width of the exciting current is set by means of the appropriately clocked switching of the transistor power end stage 14. If the saturation voltage of the transistor power end stage 14 exceeds the reference voltage $U_{REF}$, the pulse width ratio is correspondingly reduced via the pulse width modulating circuit 22. The saturation voltage which occurs as a result of this is again compared during the next switching period with the reference voltage $U_{REF}$ by means of the comparator 16, so that another change of the pulse width ratio can take place if needed. This process is repeated until the output voltage of the generator has been regulated to a fixed value by means of the setting of the pulse width ratio during the exciting current. The maximum value of the reference voltage $U_{REF}$, through whose ratio in relation to the saturation voltage of the transistor power end stage 14 the pulse width ratio of the exciting current is determined in the end, is fixed in such a way that throughout all process scattering a continuous operation with power losses occurring in its course can be tolerated without damage by the transistor power end stage 14.

Via the delay member 28, which triggers the set input of the flip-flop 18 at an adjustable delay time, the actual exciting current is, at the end of the delay period set by means of the delay member 28, in order to detect an increase in the exciting current occurring because of a short circuit. In case of a short circuit between the terminals DF and B+, the exciting current through the transistor power end stage 14 would increase within the normal switched-on time so greatly, that the destruction of the transistor power end stage 14 would be unavoidable. Therefore, after switching on the transistor power end stage 14, the scanning of the output of the comparator 16 by means of the flip-flop 18 and the delay time set by means of the delay member 28 takes place within a very short time after the transistor power end stage 14 has been switched on. If at this time, which is determined by the delay time, the reference voltage $U_{REF}$ has already been exceeded by the saturation voltage, the transistor power end stage 14 is immediately switched off and remains in the switched-off state for the remainder of the switching period. Switching off takes place via the output of the flip-flop 18, which is connected via the OR gate 27 with the reset input R of the flip-flop 26. Setting of the set input of the flip-flop 20 takes place simultaneously, so that the current at the time of switching off the transistor power end stage is detected.

This process is repeated at the start of each switching period of the transistor power end stage 14 as long as the short circuit between the terminals DF and B+ exists. Even a continuous short circuit between the terminals DF and R+ is tolerated without damage by the transistor power end stage 14, because the delay time has been set to be appropriately short via the delay member.

By setting the flip-flop 20, it is possible at the time of the short circuit to indicate the short circuit independently of the actual current limitation of the exciting current. Further than that, by interrogating further threshold values of the saturation voltage of the transistor power end stage 14 via the comparator 16 and/or an additional comparator, the detection of various errors in the circuitry is possible at the terminal DF. For example, it is possible to detect shunts from the terminal DF to the terminal B+ or B– (a generator terminal not represented in the drawing) and/or a short circuit between the terminal Df and the terminal b–.

What is claimed is:

1. A generator regulator for an output voltage of a generator in a motor vehicle power supply system, said generator comprising an excitation winding; wherein said generator regulator comprises
    a transistor power end stage (14) connected to the excitation winding (12) of the generator, said transistor power end stage comprising means for providing a pulsed excitation current passing through the excitation winding (12) during operation; and
    means for activating and deactivating the transistor power end stage (14) to provide a predetermined pulse width for the pulsed excitation current passing through the excitation winding (12) so as to maintain said output voltage of the generator at a fixed value;
    wherein said means for activating and deactivating the transistor power end stage (14) comprise
        means (16) for comparing a saturation voltage ($U_{SAT}$) of the transistor power end stage (14) picked up at a node (K1) between said transistor power end stage and the excitation winding with a reference voltage ($U_{ref}$) to provide a comparison output; and
        a pulse width modulation circuit (22) for controlling the transistor power end stage (14) to change and set the predetermined pulse width of the pulsed excitation current according to the comparison output,
        whereby damage to the transistor power end stage (14) due to a short circuit is prevented.

2. The generator regulator as defined in claim 1, wherein said means for activating and deactivating the transistor power end stage (14) comprises means for delaying the comparing of the saturation voltage ($U_{SAT}$) with the reference voltage ($U_{ref}$) for a predetermined adjustable delay time interval after turning on the excitation current with the transistor power end stage (14) during a switched-on period.

3. The generator regulator as defined in claim 2, wherein said means for activating and de activating the transistor power end stage (14) comprises means (28) for adjusting the adjustable delay time interval for the comparing, a flip-flop (18) having a flip-flop input connected to the means (16) for comparing to receive the comparison output and a flip-flop output, and another flip-flop (26) connected to the flip-flop output of the flip-flop (18) and to the pulse width modulation circuit (22).

4. The generator regulator as defined in claim 3, wherein the pulse width modulation circuit (22) activates the transistor power end stage (14) via the another flip-flop (26) to shut off the excitation current to the excitation winding for a remaining portion of a switched-on period for the excitation current when the saturation voltage ($U_{SAT}$) exceeds the reference voltage ($U_{ref}$) during the switched-on period.

5. The generator regulator as defined in claim 3, wherein the means (28) for adjusting the delay time interval adjusts the delay time so that the transistor power end stage (14) withstands repeated activation for a predetermined activation time without damage during a time interval in which said short circuit occurs via the excitation winding (12).

6. The generator regulator as defined in claim 3, wherein the pulse width modulation circuit reduces the pulse width during a subsequent switched-on period of the transistor power end stage (14) when the saturation voltage ($U_{SAT}$)

exceeds the reference voltage ($U_{ref}$) during a switched-on period for the excitation current prior to the subsequent switched-on period.

7. The generator regulator as defined in claim 3, wherein the pulse width modulation circuit (22) activates the transistor power end stage (14) via the another flip-flop (26) to immediately shut off the excitation current to the excitation winding during a switched-on period when the saturation voltage ($U_{SAT}$) exceeds the reference voltage ($U_{ref}$).

* * * * *